United States Patent [19]
Hsieh et al.

[11] Patent Number: 6,037,296
[45] Date of Patent: Mar. 14, 2000

[54] COMONOMER PRETREATED BIMETALLIC CATALYST FOR BLOW MOLDING AND FILM APPLICATIONS

[75] Inventors: John T. T. Hsieh, Warren; Sandra D. Schregenberger, Neshanic, both of N.J.

[73] Assignee: Mobil Oil Corporation, Fairfax, Va.

[21] Appl. No.: 09/066,216

[22] Filed: Apr. 24, 1998

Related U.S. Application Data

[63] Continuation-in-part of application No. 08/680,419, Jul. 15, 1996, abandoned.

[51] Int. Cl.[7] .................................................. B01J 31/22
[52] U.S. Cl. .......................... 502/113; 502/103; 502/115; 502/116; 502/117; 502/120; 502/125; 502/152; 526/114
[58] Field of Search .................................... 502/103, 113, 502/115, 116, 117, 120, 125, 152; 526/114

[56] References Cited

U.S. PATENT DOCUMENTS

| | | | |
|---|---|---|---|
| 3,135,809 | 6/1964 | Bosmajian | 260/650 |
| 3,242,099 | 3/1966 | Manyik et al. | 252/429 |
| 3,950,269 | 4/1976 | Setterquist | 252/430 |
| 4,188,470 | 2/1980 | Collina et al. | 526/64 |
| 4,299,936 | 11/1981 | Candlin et al. | 526/119 |
| 4,310,648 | 1/1982 | Shipley et al. | 526/114 |
| 4,324,691 | 4/1982 | Hartshorn | 252/429 |
| 4,329,252 | 5/1982 | Gavens et al. | 525/429 B |
| 4,338,424 | 7/1982 | Morita et al. | 526/65 |
| 4,356,111 | 10/1982 | Shipley et al. | 252/429 B |
| 4,399,053 | 8/1983 | Shipley et al. | 252/429 B |
| 4,402,861 | 9/1983 | Hoff | 252/429 B |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,446,288 | 5/1984 | Hoff | 526/129 |
| 4,518,751 | 5/1985 | Mizogami et al. | 526/114 |
| 4,525,547 | 6/1985 | Kato et al. | 526/68 |
| 4,525,550 | 6/1985 | Warzelhan et al. | 526/116 |
| 4,525,557 | 6/1985 | Heilman et al. | 526/128 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,554,265 | 11/1985 | Graves | 502/113 |
| 4,568,659 | 2/1986 | Warzelhan et al. | 502/111 |
| 4,578,373 | 3/1986 | Grayes | 502/113 |
| 4,579,836 | 4/1986 | Arzoumanidis et al. | 502/109 |
| 4,618,660 | 10/1986 | Graves | 526/114 |
| 4,658,078 | 4/1987 | Slaugh et al. | 585/512 |
| 4,659,685 | 4/1987 | Coleman, III et al. | 502/113 |
| 4,665,047 | 5/1987 | Slaugh et al. | 502/108 |
| 4,701,432 | 10/1987 | Welborn, Jr. | 502/113 |
| 4,703,094 | 10/1987 | Baufast | 526/65 |
| 4,707,530 | 11/1987 | Johnson | 526/129 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,794,096 | 12/1988 | Ewen | 502/117 |
| 4,808,561 | 2/1989 | Welborn, Jr. | 502/104 |
| 4,814,540 | 3/1989 | Watanabe et al. | 585/523 |
| 4,820,786 | 4/1989 | Bacskai | 526/152 |
| 4,871,704 | 10/1989 | Kohara et al. | 502/114 |
| 4,874,734 | 10/1989 | Kioka et al. | 502/104 |
| 4,897,455 | 1/1990 | Welborn, Jr. | 526/129 |
| 4,910,272 | 3/1990 | Marchand et al. | 526/129 |
| 4,912,075 | 3/1990 | Chang | 502/107 |
| 4,914,253 | 4/1990 | Chang | 585/523 |
| 4,918,038 | 4/1990 | Samuels et al. | 502/112 |

(List continued on next page.)

FOREIGN PATENT DOCUMENTS

| | | |
|---|---|---|
| 0515132 | 5/1992 | European Pat. Off. . |
| 0516458 | 5/1992 | European Pat. Off. . |

OTHER PUBLICATIONS

1980 Dissertation of Andresen with Translation, "UV spektroskopische Untersuchungen . . . als Katalysatorkompohente".
1985 Dissertation of Hahnsen with Translation, "Kinetische und mechanistische . . . und Methylaluminoxan".
1985 Dissertation of Kulper with Translation, "Polymerisationsverhalten von loslichen, . . . gegenuber 1–Olefinen".
1981 Diplomarbeit of Kulper with Translation, "Homogene, Chlorhaltige . . . –von $(CpMe_5)_2ZrCl_2$ . . . von $Cp_2ZrCl_2$ . . . von Ethen".
Herwig Dissertation with Translation Enclosed, "Olefinpolymerisation mit loslichen, . . . Aluminiumalkylkompo-nente".
Furtek, A.B., "Ultra Strength Polyethylene Resins Produced in a Fluid–Bed Process Utilizing Metallocene–Based Catalysts", Catalyst Consultants, Inc., 125–137, May 1993.
W. Marconi et al., Chem. and Indus., vol. 44, No. 3, 234–240 (1962).
Kaminsky, W. Dr., "Metallocene Catalysts", Global Business Chamges, Monomers, Polymers, Markets and Applications, III–3.1–III–3.21, Dec. 1992.
Sinn et al, Angew. Chem. Int. Ed. ENGL 19 (1980) 390–392.
Kaminsky et al, Makromol. CHem., Rapid Commun. 5, 225–228 (1984).
Soga et al, Makromol. Chem., Rapid Commun. 8, 305–310 (1987).
Kaminsky et al, Makromol Chem., Rapid Commun. 4, 417–421 (1983).

*Primary Examiner*—David W. Wu
*Assistant Examiner*—Caixia LuRutt
*Attorney, Agent, or Firm*—Lori F. Cuomo; Dennis P. Santini

[57] ABSTRACT

The invention relates to a catalyst component which is a tract product of reagents comprising silica which has a pore volume which exceeds 2.9 cc/gram and an average pore diameter which exceed 400 Angstroms;

a metallocene of a first transition metal, activated by an alumoxane, a contact product of dialkylmagnesium and trialkylsilanol, a second transition metal source which exhibits a hydrogen response which is different from that of the metallocene an olefin of 4 to 20 carbon atoms. This catalyst component is activated by an aluminum alkyl activator.

17 Claims, 1 Drawing Sheet

U.S. PATENT DOCUMENTS

| | | | |
|---|---|---|---|
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,939,217 | 7/1990 | Stricklen | 526/114 |
| 4,946,816 | 8/1990 | Cohen et al. | 502/126 |
| 4,952,540 | 8/1990 | Kioka et al. | 502/9 |
| 4,962,248 | 10/1990 | Winter et al. | 585/12 |
| 4,962,262 | 10/1990 | Winter et al. | 585/512 |
| 4,980,330 | 12/1990 | Marchand et al. | 502/115 |
| 5,001,205 | 3/1991 | Hoel | 526/128 |
| 5,006,500 | 4/1991 | Chang | 502/107 |
| 5,008,228 | 4/1991 | Chang | 502/111 |
| 5,021,595 | 6/1991 | Datta | 556/42 |
| 5,023,388 | 6/1991 | Luker | 585/9 |
| 5,026,797 | 6/1991 | Takahashi | 526/124 |
| 5,032,562 | 7/1991 | Lo et al. | 502/112 |
| 5,043,515 | 8/1991 | Slaugh et al. | 585/512 |
| 5,055,438 | 10/1991 | Canich | 502/117 |
| 5,057,475 | 10/1991 | Canich et al. | 502/104 |
| 5,066,631 | 11/1991 | Sangokoya et al. | 502/152 |
| 5,077,255 | 12/1991 | Welborn et al. | 502/104 |
| 5,082,817 | 1/1992 | Albizzati et al. | 502/102 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,120,696 | 6/1992 | Tsutsui et al. | 502/113 |
| 5,122,491 | 6/1992 | Kioka et al. | 502/117 |
| 5,126,301 | 6/1992 | Tsutsui et al. | 502/108 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,162,278 | 11/1992 | Razavi | 502/152 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,173,464 | 12/1992 | Pettijohn | 502/104 |
| 5,182,244 | 1/1993 | Pettijohn | 502/110 |
| 5,189,000 | 2/1993 | Masi et al. | 502/113 |
| 5,196,496 | 3/1993 | Galimberti et al. | 526/348 |
| 5,198,399 | 3/1993 | Hoff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueli et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,258,342 | 11/1993 | Luciani et al. | 502/107 |
| 5,260,244 | 11/1993 | Pettijohn | 502/115 |
| 5,266,544 | 11/1993 | Tsutsui et al. | 502/103 |
| 5,278,117 | 1/1994 | Luciani et al. | 502/113 |
| 5,281,679 | 1/1994 | Jejelowo et al. | 526/114 |
| 5,304,523 | 4/1994 | Razavi | 502/152 |
| 5,317,036 | 5/1994 | Brady, III et al. | 523/223 |
| 5,324,800 | 6/1994 | Welborn, Jr. et al. | 526/160 |
| 5,329,033 | 7/1994 | Spaleck et al. | 556/53 |
| 5,332,706 | 7/1994 | Nowlin et al. | 502/107 |
| 5,340,786 | 8/1994 | Tsutsui et al. | 502/117 |
| 5,347,025 | 9/1994 | Yamada et al. | 556/11 |
| 5,348,926 | 9/1994 | Yamada et al. | 502/117 |
| 5,350,817 | 9/1994 | Winter et al. | 526/119 |
| 5,359,015 | 10/1994 | Jejelowo | 526/114 |
| 5,372,682 | 12/1994 | Devore et al. | 204/72 |
| 5,373,072 | 12/1994 | Chang | 526/129 |
| 5,374,700 | 12/1994 | Tsutsui et al. | 526/348.3 |
| 5,384,298 | 1/1995 | Inahara et al. | 502/104 |
| 5,385,877 | 1/1995 | Fujita et al. | 502/103 |
| 5,395,810 | 3/1995 | Shamshoum et al. | 502/113 |
| 5,399,636 | 3/1995 | Alt et al. | 526/129 |
| 5,409,874 | 4/1995 | Imuta et al. | 502/103 |
| 5,412,131 | 5/1995 | Sangokoya | 556/175 |
| 5,415,649 | 5/1995 | Zenk et al. | 526/160 |
| 5,416,053 | 5/1995 | Bai et al. | 502/128 |
| 5,416,178 | 5/1995 | Winter et al. | 526/160 |
| 5,416,179 | 5/1995 | Welch et al. | 526/160 |
| 5,422,325 | 6/1995 | Jejelowo et al. | 502/104 |
| 5,434,116 | 7/1995 | Sone et al. | 502/103 |
| 5,436,305 | 7/1995 | Alt et al. | 526/160 |
| 5,453,475 | 9/1995 | Reiger et al. | 526/160 |
| 5,455,316 | 10/1995 | Tsutsui et al. | 526/114 |
| 5,455,365 | 10/1995 | Winter et al. | 556/7 |
| 5,459,217 | 10/1995 | Todo et al. | 526/348.1 |
| 5,466,649 | 11/1995 | Jejelowo | 502/120 |
| 5,466,766 | 11/1995 | Patsidis et al. | 63/129 |
| 5,498,582 | 3/1996 | Krause et al. | 502/103 |
| 5,525,678 | 6/1996 | Mink et al. | 525/246 | under the same polymerization and hydrogen conditions.

COMONOMER PRETREATED BIMETALLIC CATALYST FOR BLOW MOLDING AND FILM APPLICATIONS

CROSS-REFERENCE TO RELATED APPLICATIONS

This is a continuation-in-part of application Ser. No. 08/680,419, filed Jul. 15, 1996, now abandoned, which is relied upon and incorporated herein by reference.

FIELD OF THE INVENTION

The invention relates to a mixed catalyst or a bimetallic catalyst. It also relates to a synthesis for the catalyst which results in improved properties that are manifested in the bimodal molecular weight distribution products which are produced in the (co)polymerization of ethylene in a single reactor in the presence of the catalyst. The last step in the synthesis of the catalyst is contact with a monomer of alpha olefin of 3 to 10 carbon atoms. This allows for very high density ethylene polymers or copolymers to be produced.

BACKGROUND OF THE INVENTION

Bimodal molecular weight distribution products and broad molecular weight distribution products of ethylene polymers and copolymers contain two components of different molecular weight, one component having a relatively high molecular weight compared to the second component and designated by the acronym HMW (high molecular weight); the second component being of relatively lower molecular weight than the HMW component and being designated by the acronym LMW (low molecular weight component.) In turn, the HMW and the LMW components can have varying molecular weight distribution. The production of two different molecular weight components is related to the hydrogen response, and thus process conditions of polymerization or copolymerization. By comparison, the molecular weight distribution is dependent on the catalyst per se.

For films produced from high molecular weight polyethylene or copolymers of ethylene and for HIC (household and industrial containers) applications, the resin of ethylene preferably is characterized by gel permeation chromatography (GPC) for molecular weight distribution. Resins suitable for film applications typically show a distinctly bimodal molecular weight distribution, with the LMW and HMW components approximately equal in concentration. A HIC resin is narrower in molecular weight distribution, and is typically characterized with an HMW shoulder.

SUMMARY OF THE INVENTION

The catalyst precursor of the invention which is more fully described below comprises two transition metals. Its method of synthesis directly affects the properties of ethylene polymer and copolymer products produced in catalytic polymerization and copolymerization. Prior to activation with an alkyl aluminum compound, the catalyst precursor is allowed to contact a polymerizable monomer which is an alpha olefin, under temperature conditions below 50° C. Incorporation of the alpha olefin, e.g. hexene, is detected by weight gain, after hexene contact. SEM characterization does not establish that hexene polymerizes during that contact.

The total amount of transition metals ranges from 0.2 to 1.0 millimole per gram support. The amount of titanium ranges from 0.1 to 0.5, preferably from 0.2 mmole to 0.4 per gram silica. The amount of Zr ranges from 0.06 to 0.1, preferably 0.07 to 0.087 millimoles per gram silica.

DETAILED DESCRIPTION OF THE INVENTION

Figure 1:
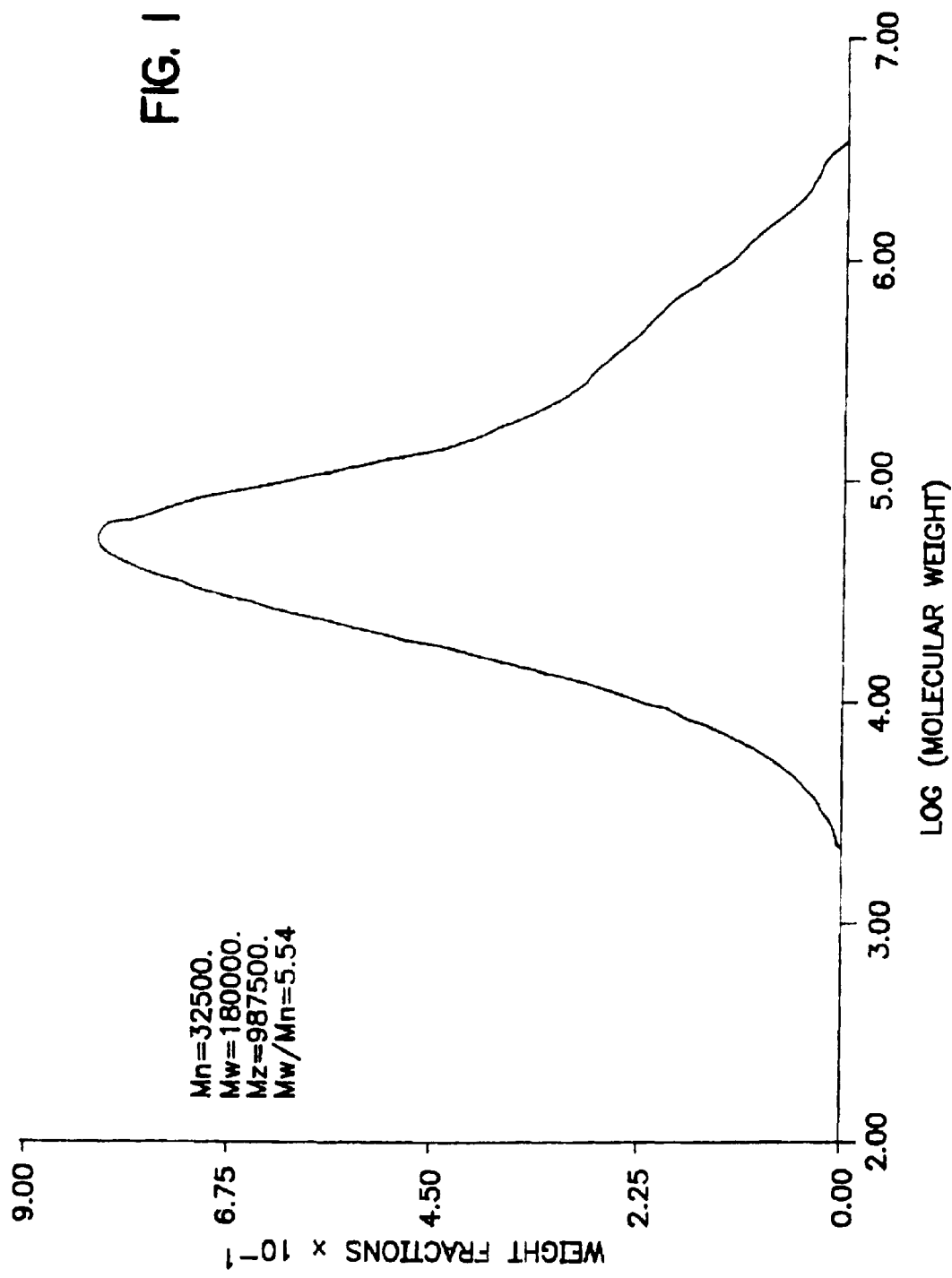
FIG. 1 is a gel permeation chromatogram of a polyethylene resin of the examples.

In particular, the invention relates to a catalyst component which is a contact product of reagents comprising
- silica which has a pore volume which exceeds 2.9 cc/gram and an average pore diameter which exceed 400 Angstroms;
- a metallocene of a first transition metal, activated by an alumoxane,
- a contact product of dialkylmagnesium and trialkylsilanol,
- a second transition metal source which exhibits a hydrogen response which is different from that of the metallocene
- an olefin of 4 to 20 carbon atoms. Although the olefin increases the weight of the catalyst component, SEM studies did not reveal whether the olefin had polymerized; accordingly, the olefin may be an olefin, oligomers thereof, derivatives thereof and/or polymers thereof. This catalyst component is activated by an aluminum alkyl activator.

The presence of the olefin, oligomers, polymers and derivatives thereof, in the catalyst component increases the catalyst activity and thus increases productivity associated with catalyst use. Moreover, this productivity is enhanced even under conditions for the production of very high density polyethylene, which is required for HIC product. The two different transition metal sources exhibit different hydrogen responses, and thus different chain termination rates; accordingly, the two transition metal sources will produce polyethylenes of at least two different molecular weights. Although in specific embodiments herein the two different transition metal sources can be characterized as a metallocene component and a non-metallocene component, the critical distinction is the fact that the two different transition metal sources exhibit different hydrogen response, under the same polymerization and hydrogen conditions. The catalyst component will now be illustrated in terms of preferred embodiments.

Silica is the preferred support and has a pore volume which exceeds 2.9 cc/g, preferably greater than 3 cc/g; and most preferably a pore volume of greater than 3.1 cc/g. Preferably the average pore diameter exceeds 400 Angstroms. The silica preferably has hydroxyl groups. Silica which is purchased must be dehydrated. Elevated temperatures are used to dehydrate the silica. This can be done at temperatures from 200 to 900° C., preferably from 200 to 300° C. As the temperature of dehydration is increased, the number of silica silanol or hydroxy groups decreases. Accordingly, if higher hydroxyl numbers on the silica are desired, then the dehydration temperature is at the lower end of these ranges, e.g. at 200° C. Parenthetically, higher dehydration temperatures reduce the hydroxyl or silanol group content of the silica. The preferred silica, PQ 988 (or PQ MS 3030), is also characterized by a very narrow pore size distribution. The silica has an hydroxyl content of at least 0.7 millimoles per gram of silica.

A sample of the silica is impregnated with a metallocene. Preferably, the metallocene is activated with a composition comprising a Group III element, e.g., with a boron compound or alumoxane prior to the impregnation.

The amount of alumoxane ranges from 1 mmol/g catalyst to 10 mmol/g catalyst, preferably 4 mmol/g cat to 7 mmol/g cat in the finished catalyst. To form catalysts of the invention, all catalyst components can be dissolved in alumoxane and impregnated into the carrier. Catalyst preparation is undertaken under anhydrous conditions and in the absence of oxygen. The class of alumoxanes comprises oligomeric linear and/or cyclic alkylalumoxanes represented by the formula: R—(Al(R)—O$_n$O/AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1C_8$ lkyl group and preferably methyl. Methylalumoxane (MAO) is a mixture of oligomers with a very wide distribution of molecular weights and usually with an average molecular weight of about 1200. MAO is typically kept in solution in toluene. The volume of the solution comprising an alumoxane and a solvent therefor can vary, depending on the catalyst sought to be produced.

The metallocene compounds can be selected from a large variety of compounds. The metallocene compound has the formula $Cp_mMA_nB_p$ in which Cp is an unsubstituted or substituted cyclopentadienyl group and unbridged or bridged indenyl, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight or branched chain C1–C6 alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by ethylene or dialkylsilane groups, such as —CH2—, —CH2—CH2—, —CR'R"— and —CR'R"—CR'R"— where R' and R" are short alkyl groups or hydrogen, —Si(CH3)2—, Si(CH3)2—CH2—CH2—Si(CH3)2— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched C1—C8 alkyl groups, such as methyl, ethyl, n-propyl, isopropyl, n-butyl, isobutyl, n-pentyl, n-hexyl or n-octyl. The molar ratio of this transition metal provided as a metallocene to the other non-metallocene transition metal source ranges from 0.1 to 1.0. Preferably, the metallocene is 1,1-ethylene ridged bis(indenyl) zirconium dichloride.

In a preferred embodiment, the metallocene is added to the solution of the alumoxane prior to impregnating the carrier with the solution. The mole ratio of aluminum provided by alumoxane, expressed as Al, to metallocene metal expressed as M (e.g. Zr), ranges from 50 to 500, preferably 75 to 350, and most preferably 100 to 300. An added advantage of the present invention is that this Al:Zr ratio can be directly controlled. In a preferred embodiment the alumoxane and metallocene compound are mixed together at an ambient temperature for 0.1 to 6.0 hours prior to use in the infusion step. The solvent for the metallocene and alumoxane can be appropriate solvents, such as aromatic hydrocarbons including benzene, toluene, xylene, halogenated aromatic hydrocarbons, ethers, cyclic ethers or esters. Preferably it is toluene.

As indicated above, preferably, the metallocene is introduced to the support in activated form. However, the steps of introducing the metallocene to the support and activating it can be undertaken seriatim. Temperatures of support contact can range from 20 to 50° C. In preferred embodiments herein the deposited metallocene source is subjected to contact with a liquid alkane of 5 to 10 carbon atoms, preferably heptane, and isopentane.

Thereafter, the support containing the transition metal provided as a metallocene source is dried in nitrogen under inert conditions, at ambient temperature conditions, to isolate a particulate product.

The support and transition metal provided as a metallocene are contacted with a contact product of (a) trihydrocarbyl silanol and dialkylmagnesium and (b) a mixture of alcohol and titanium, at temperatures ranging from 20 to 60° C. Heptane is used as a solvent for contact of (a) and (b) but any hydrocarbon solvent may be used. This contact of (a) and (b) can be conducted at temperatures ranging from 20 to 45° C. Isolation of the supported metallocene can be conducted at 20 to 60° C. under inert conditions, e.g. a nitrogen purge.

The trihydrocarbyl silanol of (a) trihydrocarbylsilanol and dialkylmagnesium can be represented by the empirical formula $A_xB_yC_zSiOH$. The hydrocarbyl of A, B and C can be alkyl or aryl. If A, B or C is alkyl, it can contain 1 to 10 carbon atoms and preferably it contains 1 to 6 carbon atoms, most preferably contains 2 carbon atoms. If A, B or C is aryl it can be unsubstituted phenyl or benzyl or substituted phenyl or benzyl; preferably, if A, B or C is aryl, it contains 6 to 10, preferably 6 to 8 carbon atoms. Each of x, y, and z can be 1 and the sum of x+y+z=3.

The dialkymagnesium $R_1MgR_2$ contains alkyl groups, $R_1$ and $R_2$. Each of the alkyl groups may be the same or different and contain 1 to 10 carbon atoms, preferably 2 to 6 carbon atoms. In a preferred embodiment, equal moles of trihydrocarbylsilanol and dialkylmagnesiums, the reaction product of trihydrocarbyl siloxy magnesium alkyl can be described as the result of the following equation

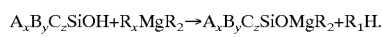

Reaction of that contact product with surface silica hydroxyl groups (referred to herein as silica-OH)can be depicted by the following equation

When, for example, triethylsilanol and dibutylmagnesium are reacted in equimolar amounts, the foregoing equations become

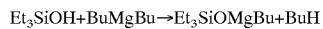

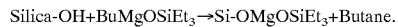

The second transition metal, provided as a non-metallocene, is preferably a titanium(IV) source. It will exhibit a different hydrogen response from the metallocene in that under identical hydrogen concentration, each transition metal source will produce polyolefin (polyethylene) of at least two different molecular weight(s). The titanium source is a contact mixture of an alcohol and titanium tetrachloride. The relative amounts (molar ratio) of alcohol to titanium metal (metal basis) can range from 0.1 to 1. This is then dried at 45° C. and under nitrogen purge.

The isolated particulate intermediate containing both transition metals is then contacted with an alpha olefin of 3 to 10 carbon atoms preferably 4 to 10 carbon atoms, e.g. butene-1, pentene, methylpentene, hexene and octene. In the embodiments below, the contact of the supported two transition metals is undertaken at ambient conditions of temperature under an inert (nitrogen) atmosphere. The amount of the olefin ranges from 2 Hexene/Ti molar ratio to 60 Hexene/Ti molar ratio, when the second transition metal source is a titanium compound. Preferably, this contact is undertaken prior to activation of the titanium sites with the alkyl aluminum activator or co-catalyst. Although the olefin increases the weight of the catalyst component, SEM studies did not reveal whether the olefin had polymerized; accordingly, the olefin may be an olefin, oligomers thereof, derivatives thereof and/or polymers thereof.

The catalyst can be used in the polymerization or co-polymerization of ethylene under slurry, solution or gas phase conditions (e.g. fluid bed gas phase conditions). Preferably the temperature is in the range of 35 to 120° C. and the pressure is below 1000 psi, preferably below 400 psi. In preferred embodiments, the catalyst is presently run at slurry conditions. The amount of activator employed ranges from 5 to 500 Al/Ti molar ratio, based on the total Ti transition metal. The aluminum alkyl activator may be a trialkylaluminum or a dialkylaluminum hydride in each of which the alkyl is the same or different and contains 1 to 10 carbon atoms.

The olefin, e.g., hexene, contact step results in catalysis product of higher density, with less alpha olefin incorporation into the polymer or copolymer, when ethylene is subjected to co-polymerization with olefins of 3 to 10 carbon atoms, preferably to 8 carbon atoms. Moreover, the target FI of the resulting polymers could be reached because of this treatment. The Top Load Strength property or stiffness of bottle made is also improved.

EXAMPLES ILLUSTRATING ESSENCE OF INVENTION

The objective of these examples is to demonstrate that a modified bimetallic catalyst can polymerize ethylene with good productivity under the very high density conditions required for HIC resin production. Due to the exceptionally high hexene incorporation of the Zr sites, a bimetallic HIC catalyst containing Zr sites produces resins with a density of around 0.946 instead of the desired >0.950 g/cc under our a standard slurry HIC conditions (90° C., H2/C2=0.04, 30 ml 1-hexene). Moreover, if the 1-hexene content is lowered to 20 ml to increase the product density, the productivity decreases to less than half. Therefore, we developed a new catalyst preparation procedure to address this problem.

EXAMPLE 1

A Typical Method for Preparing the Bimetallic Catalyst.

a. Component A

Philadelphia Quartz 988-1M silica was dehydrated at 200 C for 16 hours. In a flask, 0.89 g of 1,1-ethylene bis(indenyl) Zirconium Dichloride (from Boulder Scientific Company) was mixed with 86.4 ml of methylalumoxane (MAO) solution (4.76M, from Witco/Schering Company). In another flask, this reaction product solution was mixed with 58.4 g of the 200° C. dehydrated silica and 240 ml of heptane was added to help disperse the Zr/MAO complex. The slurry was dried to remove heptane and toluene under nitrogen purge at 41° C. for 16 hours. 82.8 g of the precursor was obtained. The uniformity of MAO distribution among the particles is quite good as indicated by Scanning Electron Microscopy Analysis; this precursor showed that 95% of particles have similar amount of Al and only 5% of the particles have higher levels of Al.

b. Component B

In a flask, 30.9 ml of 0.736 M dibutylmagnesium (DBM) in heptane solution was dissolved in 450 ml heptane and heated to 45° C. Then 3.45 ml of triethylsilanol was added slowly and stirred for at least 30 minutes. The Component B solution was added to the Component A flask which contains 82.8 grams of the precursor and stirred for at least 30 minutes.

c. Final Catalyst

In another flask, 24.6 ml of 0.912 M $TiCl_4$ in heptane solution was diluted in 400 ml of heptane. Then 11.3 ml of 0.829 M pentanol/heptane solution was added slowly with stirring at room temperature to give a 0.5 pentanol/Ti molar ratio. This modification will allow us to adjust the MW of Ti-catalyzed polymer for optimized product performance. This solution was added to the slurry of component A/B. A new brownish slurry mixture was formed. The slurry was dried to solid by nitrogen purging at 42° C. for 16 hours. 69.2 g of light brown solid was obtained.

EXAMPLE 2

Preparation of Hexene Pretreated Catalyst 1 g of Example 1 catalyst was slurried with 10 ml heptane in a flask. 1 ml of hexene was added and stirred under nitrogen purge overnight (16 hours). 1.3 g of dry powder was obtained.

EXAMPLE 3

Typical Polymerization Procedures 3 liters of heptane were transferred to a 2.5-gallon reactor and 1 ml of 1.258M solution of diisobutylaluminum hydride (DIBAH) in heptane was injected into the reactor under agitation (900 RPM). 1-hexene was then transferred to the reactor. The reactor was heated to 90° C. and 7.5 psia of hydrogen was fed into the reactor to obtain a $H_2/C_2$ molar ratio of 0.04. The reactor was saturated with 200 psig ethylene to maintain the ethylene partial pressure of 182 psia. 0.15 gram of Example 2 catalyst and 300 ml of heptane were fed into the reactor, using ethylene pressure slightly above the reactor pressure, to start the polymerization.

The polymerization was maintained at 90° C. for ½ hour. The polymer slurry was stabilized with an antioxidant package and dried overnight at room temperature. The solid product was placed in a vacuum oven for 1 hour. The polymer was weighed and a productivity of about 2000 g/g cat/hr was calculated. The dry granular product was extruded through a Randcastle mini-extruder. The following melt flow properties were determined: $I_2$ (melt index) and $I_{21}$ (flow index). GPC analysis on the extrudate was used to determine whether or not it is suitable for premium HIC or HMW film applications.

We conducted ethylene polymerization experiments with several levels of 1-hexene using the above-mentioned procedures with Example 2 catalyst, and compared the results with the untreated catalyst. As shown in the table below, this catalyst not only enabled us to polymerize ethylene at reduced hexene levels (even homopolymerization of ethylene), but also greatly improved the catalyst activity (more than three-fold at lower level hexene concentrations).

| Amount of Hexene (ml) | Productivity (g/g cat/hr) | FI ($I_{21}$) | MFR ($I_{21}/I_2$) |
| --- | --- | --- | --- |
| untreated | | | |
| 30 | 1400 | 50 | 125 |
| 20 | 600 | 2 | 89 |
| treated | | | |
| 30 | 2500 | 24 | 89 |
| 20 | 2100 | 15 | 127 |
| 10 | 1700 | 4 | 129 |
| 0 | 1100 | 0.5 | 121 |

90 C., H2/C2 = 0.04, heptane-slurry

The resin produced with the hexene treated bimetallic catalyst (under reduced hexene concentration, i.e. 20 ml case) showed the desired MFR and bimodal MWD required for premium HIC applications (FIG. 1).

Note: In the foregoing Table, $I_{21}$ is measured according to ASTM D-1238 condition F at 190° C. and $I_2$ is measured according to ASTM D-1238 condition E at 190° C.; the ratio of $I_{21}/I_2$ is MFR.

What is claimed is:

1. A catalyst component made by a process comprising
   providing silica having an hydroxyl content of at least 0.7 millimoles per gram of silica;
   impregnating the silica with a solution of activated metallocene complex, to form a particulate product which contains OH groups pendant from silica;
   contacting a slurry of the particulate product with a reaction product of trihydrocarbyl silanol and dialkylmagnesium, and allowing the OH groups pendant from silica and the reaction product to form a contact product;
   impregnating the contact product with a second transition metal source which exhibits a different hydrogen response from the metallocene complex to form a solid; and
   reacting said solid with an olefin of 4 to 20 carbon atoms.
2. The catalyst component of claim 1 wherein the silica is calcined at 200–300 degrees C.
3. The catalyst component of claim 1 wherein the reaction product is formed by a 1:1 molar ratio of silanol and dialkylmagnesium to form a product.
4. The catalyst component of claim 1, wherein the dialkylmagnesium is dibutylmagnesium and the trihydrocarbyl silanol is triethylsilanol and the reaction product comprises $Et_3SiOMgBu$ and BuH where Et is ethyl and Bu is butyl.
5. The catalyst component of claim 1, wherein the silica has a pore volume which exceeds 2.9 cc/gram.
6. The catalyst component of claim 1, wherein the second source of transition metal is a contact product of titanium tetrachloride and an alcohol containing 1 to 10 carbon atoms.
7. The catalyst component of claim 1, wherein the olefin comprises hexene.
8. The catalyst component of claim 1 wherein the metallocene is 1,1-ethylene-bis(indenyl)zirconium dichloride.
9. A supported catalyst comprising an alkyl aluminum compound selected from the group consisting of trialkylaluminum and dialkylaluminum hydride, and a catalyst component of claim 1.
10. The catalyst component of claim 9, wherein the silica is calcined at 200–300 degrees C.
11. The catalyst component of claim 9, wherein the reaction product is formed by a 1:1 molar ratio of silanol and dialkylmagnesium to form a product.
12. The catalyst component of claim 9, wherein the silica has a pore volume which exceeds 2.9 cc/gram.
13. The catalyst composition of claim 6, wherein the silica contains hydroxyl group of greater than 0.7 millimoles per gram silica.
14. The catalyst component of claim 6, wherein the second source of transition metal is a contact product of titanium tetrachloride and an alcohol containing 1 to 10 carbon atoms.
15. The catalyst component of claim 6, wherein the olefin comprises hexene.
16. The catalyst component of claim 6, wherein the alcohol is pentanol.
17. The catalyst component of claim 6, wherein the metallocene is 1,1-ethylene-bis(indenyl)zirconium dichloride.

* * * * *